United States Patent [19]

Osakabe et al.

[11] Patent Number: 4,598,287
[45] Date of Patent: Jul. 1, 1986

[54] REMOTE CONTROL APPARATUS

[75] Inventors: Yoshio Osakabe, Yokohama; Tadao Suzuki, Tokyo, both of Japan

[73] Assignee: Sony Corporation, Tokyo, Japan

[21] Appl. No.: 497,071

[22] Filed: May 23, 1983

[30] Foreign Application Priority Data

May 25, 1982 [JP] Japan .................. 57-88402

[51] Int. Cl.[4] .............................. G05B 19/02
[52] U.S. Cl. ............... 340/825.24; 340/825.25; 358/194.1
[58] Field of Search ............ 340/825.01, 825.04, 340/825.24, 825.25; 370/32; 361/100, 101; 307/570, 475; 369/19, 30; 358/194.1

[56] References Cited

U.S. PATENT DOCUMENTS 4,217,573 8/1980 Norris .................. 340/825.25
4,496,947 1/1985 Shima et al. ............. 340/825.24

Primary Examiner—Donald J. Yusko
Assistant Examiner—Sharon L. Hodgkins
Attorney, Agent, or Firm—Hill, Van Santen, Steadman & Simpson

[57] ABSTRACT

Remote control apparatus for controlling a number of pieces of equipment in which each unit includes a microprocessor which produces a first remote control signal on its data bus line and an interface circuit including a first latch circuit which receives the first remote control signal from the data bus line of the microprocessor and a second latch circuit which receives a second remote control signal on its input terminal and transfers the second remote control signal to the data bus line of the microprocessor. A common input/output terminal receives the first and second remote control signals and a switching means is connected between the common input/output terminal and a reference point such as ground and the switching means is controlled by the first remote control signal to pass it to the common input/output terminal.

6 Claims, 9 Drawing Figures

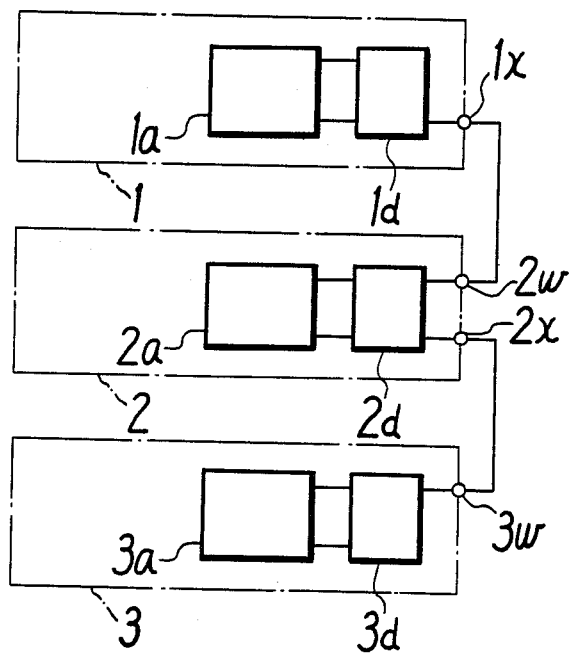
FIG. 5
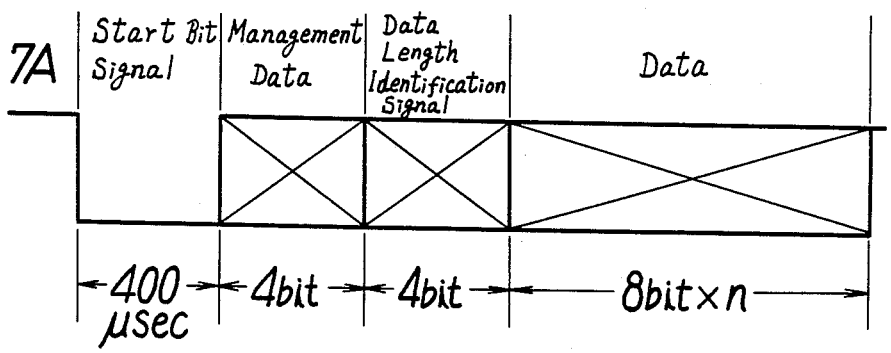
FIG. 7A
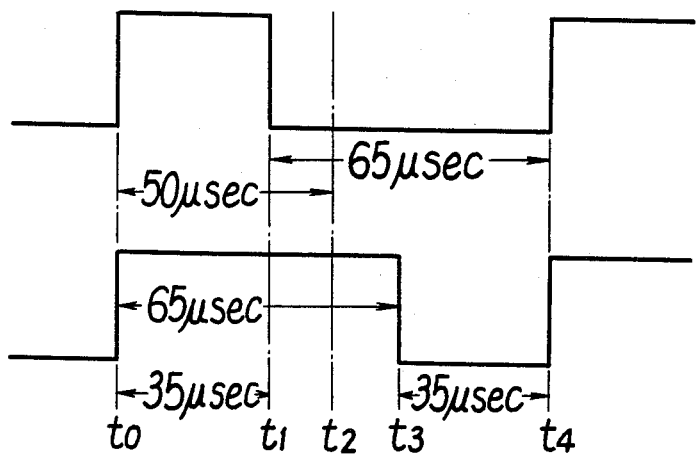
FIG. 7B
FIG. 7C

REMOTE CONTROL APPARATUS

BACKGROUND OF THE INVENTION

1. Field of the Invention

This invention relates in general to remote control apparatuses and particularly to a remote control apparatus which has input/output terminals in the control sections of a plurality of units which are connected in series so as to allow bidirectional control between any two of the plural apparatuses.

2. Description of the Prior Art

Remote control apparatus are well known which are capable of bidirectional control among different apparatuses such as tuners, tape recorders, amplifiers and other equipment.

In such previously proposed remote control apparatuses, a digital control signal for remote control which is produced by a microprocessor is applied to a common input/output terminal and transmitted through an interface circuit to the data bus line of the microprocessor, or the digital control signal is latched to the common input/output terminal from the data bus line. The interface circuit of these prior art devices includes a latch circuit formed of a D-flip-flop circuit and a buffer circuit formed of N-channel MOSFET (metal oxide semiconductor field effect transistor). It is possible that the buffer circuit will become equivalent to a diode when the power supply of the apparatus is turned off or when the signal at the input/output terminal is grounded. When, for example, the power source of a tape recorder is turned off the remote control operation between the tuner and the amplifier becomes inoperative and impossible.

SUMMARY OF THE INVENTION

It is an object of the present invention to provide a remote control apparatus capable of eliminating the defects inherent in the prior art remote control equipment.

Another object of the invention is to provide a remote control apparatus having control input/output terminals for a plurality of apparatuses which are connected in series so as to allow bidirectional control among any of the apparatuses and which has a simple construction.

According to a particular example of the present invention, a remote control apparatus is provided which includes a microprocessor that produces a first remote control signal on its data bus line and an interface circuit has at least a first latch circuit which receives the first remote control signal from the data bus line of the microprocessor and a second latch circuit which receives the second remote control signal from its input terminal and transfers the second remote control signal to the data bus line of the microprocessor. A common input/output terminal for receiving the first and second remote control signals is provided, and a switching means is connected between the common input/output terminal and a reference point such as ground. The switching means is controlled by the first remote control signal.

Other objects, features and advantages of the present invention will become apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 5 is a block diagram of the invention;

FIG. 7A is a diagram illustrating the bit pattern of a remote control data signal used in the remote control apparatus according to the invention;

FIG. 7B illustrates the wave form diagram illustrating one bit low level signal "0"; and FIG. 7C is a wave form diagram showing one bit high level "1" of data.

DESCRIPTION OF THE PREFERRED EMBODIMENTS

Figure 1:
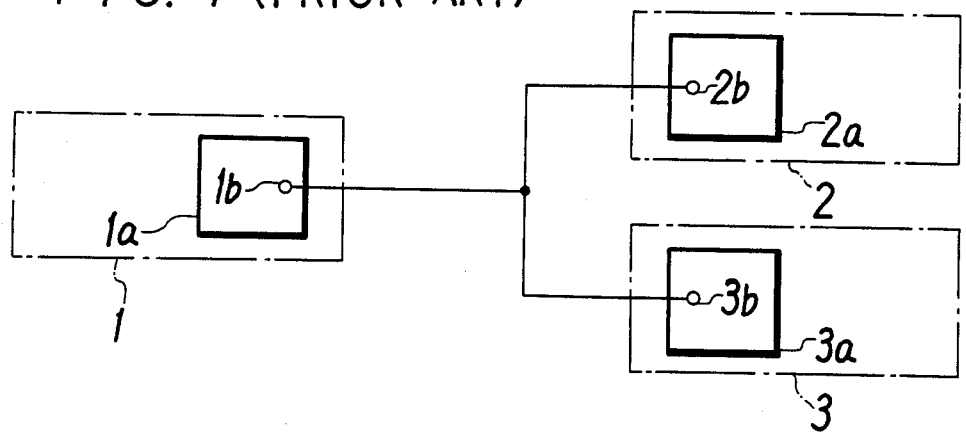
FIG. 1 is a block diagram of a prior art remote control apparatus.

The remote control apparatus according to the prior art is illustrated in FIGS. 1 through 4 and can be used for example to control a number of different apparatuses such as tuners, tape recorders, amplifiers and so forth. FIG. 1 illustrates a tuner 1 which is connected to a tape recorder 2 and an amplifier 3. The amplifier 3 may be connected to a suitable loadspeaker. The tuner 1, the tape recorder 2 and the amplifier 3 each include microcomputers 1a, 2a and 3a in their control sections. An input/output port I/O 1b of the microcomputer 1a in the tuner 1 is connected to the I/O port 2b of the microcomputer 2a in the tape recorder 2. The connection point between the I/O port 1b of the microcomputer 1a and the I/O port 2b of the microcomputer 2a is connected to an I/O port 3b of the microcomputer 3a in the amplifier 3.

An audio signal from the tuner 1 may be supplied to the tape recorder 2 and the amplifier 3, and an audio signal which is reproduced from the tape recorder 2 is supplied to the amplifier 3.

The microcomputers 1a, 2a and 3a include I/O interface circuits 1d, 2d and 3d which allow the interchange of data among the microprocessors 1a, 2a and 3a. If the central processing unit (CPU) in the microcomputer 1a is accessed by, for example, 4 bits, the I/O interface circuit 1d can access the CPU with one bit each in 4 bits. Although not illustrated, the microcomputer 1a includes in addition to the I/O interface circuit 1d other I/O interface circuits corresponding to 3 bits for the 4 bits which can independently or simultaneously access the CPU. Specifically, a signal from a predetermined bus-line of the data bus line 1c is supplied to a signal input terminal 1f of a latch circuit 1e which comprises a D-flip-flop circuit. A signal output terminal 1g of the latch circuit 1e is connected to a gate of a n-channel insulation gate-type field effect transistor 1h which has its source grounded. The drain of the insulation gate field type transistor 1h is connected to the source of an n-channel insulation gate-type field effect transistor 1i which has its drain connected to a power source terminal 1j to which a positive DC voltage is applied. The gate of the insulation gate-type field effect transistor 1i is connected to a connection point between the insulation gate-type field effect transistors 1h and 1i. The connection point between the insulation gate-type field effect transistors 1h and 1i is connected to the I/O port 1b. The I/O port 1b is connected through an inverter circuit 1k to a signal input terminal 1m of a latch circuit 1l which is a D-type flip-flop circuit. A signal output terminal 1n of the latch circuit 1l is connected through a buffer circuit 1o to the data bus line 1c. Clock signal input terminal 1p is connected to latch circuit 1e and clock terminal 1q is connected to latch circuit 1l. Clock signals applied to the clock input terminals 1p and 1q put the latch circuits 1e and 1l in the operation state. A control signal input terminal 1r supplies a signal for turning on and off the buffer circuit 1o which is connected between the latch circuit 1l and the data bus line 1c. The control signal input terminal 1r is supplied with a control signal which is synchronized with the clock signal that will be supplied to the clock signal input terminal 1q of the latch circuit 1l.

The I/O interface circuit 1d generates the signal obtained from the data bus line 1c and supplies it to the I/O port 1b when the latch circuit 1e is supplied with a clock signal at its clock input terminal 1p. The I/O interface circuit 1d allows the signal supplied to the I/O port 1b to be latched in the data bus line 1c when the latch circuit 1l and the buffer circuit 1o receive at the clock input terminal 1q and control signal input terminal 1r the clock signal and the control signal as input instructions. It is to be realized, of course, that the microcomputers 2a and 3a have interface circuits 2d and 3d which are the same as that illustrated in FIG. 2 and their description will not be repeated.

Figure 2:
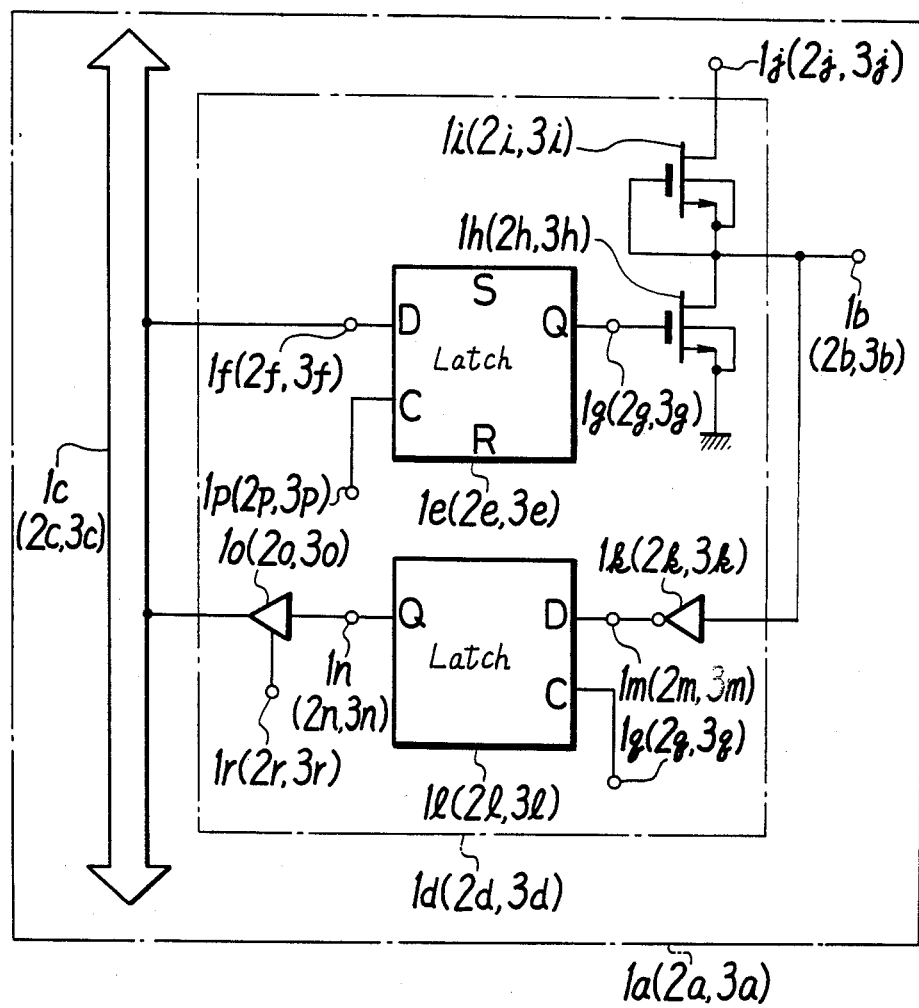
FIG. 2 is a block diagram of a prior art interface circuit.

According to the arrangement illustrated in FIGS. 1 and 2, the microcomputers 1a, 2a and 3a of the tuner 1, the tape recorder 2 and the amplifier 3 latch in the registers contained within the CPUs the signals at the I/O ports 1b 2b and 3b at every predetermined interval for example 100 microseconds and inspect whether other apparatuses have generated a start bit signal. When the tuner 1 produces a start bit signal, the tape recorder 2 and the amplifier 3 are placed in the mode for receiving signals. Next the microcomputers 2a and 3a in the tape recorder 2 and the amplifier 3 detect which of the two apparatuses the microcomputer 1a is energizing. When, for example, the amplifier 3 is to be energized, the interchange of information between the microcomputer 1a in the tuner and the microcomputer 3a in the amplifier 3 will be performed and the amplifier 3 will be controlled according to the interchange information.

In the prior art systems according to FIGS. 1 and 2, when any one apparatus, for example, the tuner 1 is not being used and the power source has been turned off but the tape recorder 2 and the amplifier 3 are being used the insulation gate-type field effect transistor 1h in the I/O interface circuit 1d of the microcomputer 1a within the tuner 1 will become equivalent to a diode when the power source is turned off thus placing the drain at ground potential or voltage which makes the I/O port 1b to be at ground voltage. For this reason, the I/O ports 2b and 3b of the microcomputers 2a and 3b in the recorder 2 and the amplifier 3 will, respectively, be grounded and the result is that interchange of information between the tape recorder 2 and the amplifier 3 is impossible and, thus, control cannot occur under these conditions.

Figure 3:
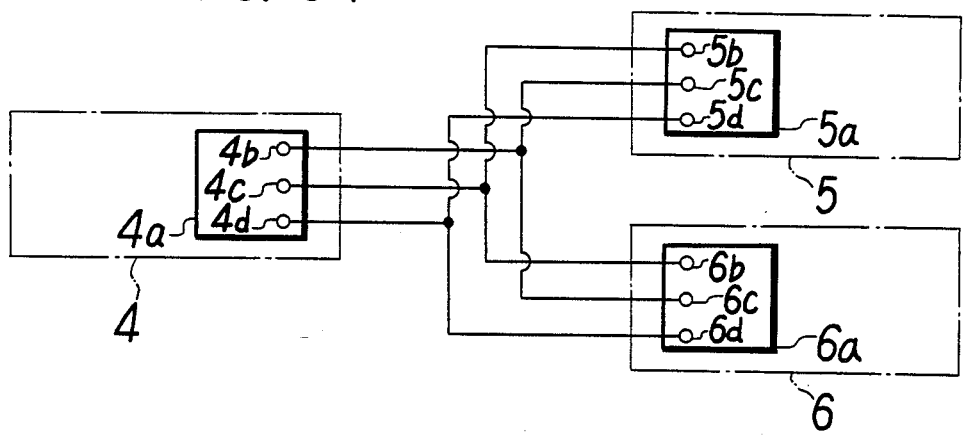
FIG. 3 is a block diagram of a prior art remote control apparatus.
Figure 4:
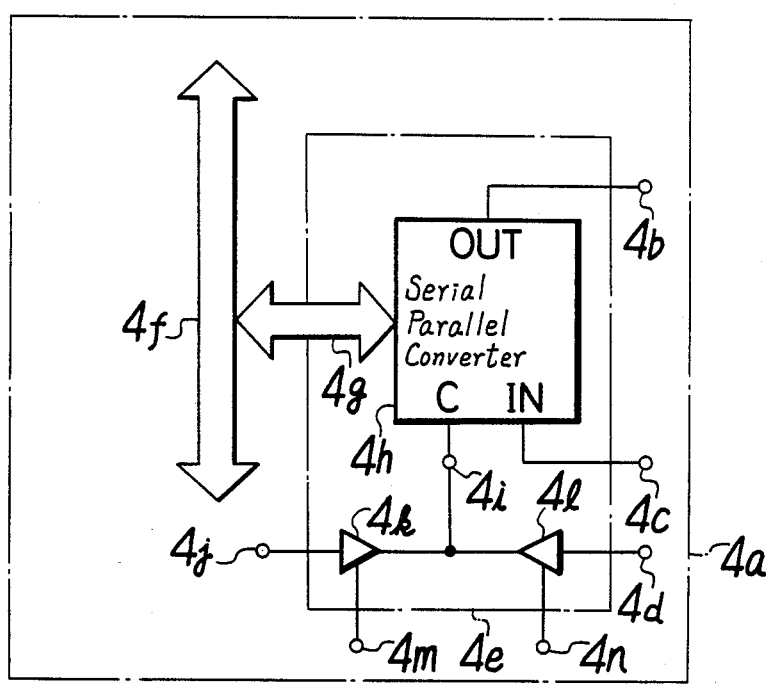
FIG. 4 is a block diagram of a prior art interface circuit.

Another prior art example is illustrated in FIGS. 3 and 4 wherein a tuner 4 is connected to a tape recorder 5 and an amplifier 6 as shown in FIG. 3, the tuner 4 includes a microcomputer 4a, the tape recorder 5 includes a microcomputer 5a and the amplifier 6 incorporates the microcomputer 6a. An output port 4b of the microcomputer 4a in the tuner 4 is connected to an input port 5c in the tape recorder 5 and to an input port 6c of the microcomputer 6a in the amplifier 6. An input port 4c of the microcomputer 4a is connected to output ports 5b of microcomputer 5a and output port 6b of microcomputer 6a. A system clock signal terminal 4d of the microcomputer 4a is connected to system clock signal terminals 5d and 6d of the microcomputers 5a and 6a, respectively. For this case, the microcomputer 4a in tuner 4 becomes the master hereinafter referred to as master computer for the microcomputers 5a and 6a in the tape recorder 5 and the amplifier 6 and the microcomputers 5a and 6a are slave computers. I/O interface circuits for the master computer 4a is illustrated in FIG. 4 as I/O interface circuit 4e. The slave computers 5a and 6a have the same I/O interface circuits as illustrated in FIG. 4.

As shown in FIG. 4, a data bus line 4f is connected through a data bus line 4g of I/O interface 4e to a signal input/output terminal of a serial buffer amplifier 4h which is capable of parallel-serial and serial-parallel conversions. The serial signal output terminal of the serial buffer amplifier 4h is connected to the output terminal 4b and the serial signal input terminal of the serial buffer circuit 4h is connected to the input port 4c. The serial buffer circuit 4h operates in synchronism with the clock signal supplied to a clock signal input terminal 4i. For this purpose, the clock signal supplied to the clock signal output terminal 4j from a clock signal generator causes delivery of the parallel signal obtained through the data bus line 4f and 4g to the output terminal 4b as the serial signal is supplied through buffer circuit 4k to the clock signal input terminal 4i. A system clock signal supplied to system clock terminal 4d to allow the acceptance of the serial signal obtained at the input port 4c in the CPU as the parallel signal through the data lines 4g and 4f is supplied through a buffer circuit 4l to the clock signal input terminal 4i. Input signal terminals 4m and 4n receive control signals for controlling the buffer amplifiers 4k and 4l so as to turn them on and off.

The master computer 4a in the tuner 4 and the slave computers 5a and 6a in the tape recorders 5 and the amplifier 6 always turn on the buffer circuits 4k and 4l to which the system clock signal is supplied to investigate whether the system clock signal is supplied to the system clock signal terminal. When for example the tuner 4 produces the start bit signal and the system clock signal, the tape recorder 5 and the amplifier 6 permit the serial buffer circuit 4k and 4l to receive the start bit signal and the system clock signal through the input ports 5c and 6c and the system clock signal terminals 5d and 6d so as to interrupt the slave computers 5a and 6a. Thus, the serial signal latched in the serial buffer circuit 4h is converted into the parallel signal by the system clock signal and latched in the CPU by way of the data bus lines. Then the slave computers 5a and 6a in the tape recorder 5 and the amplifier 6 detect which of the apparatuses the master computer 4a in the tuner 4 which is to control. When, for example, the tape recorder 5 is to be controlled, the exchange of information is carried out between the master computer 4a and the tuner 5 and the slave computer 5a in the tape recorder 5 and the tape recorder 5 is controlled according to the received information from the tuner.

In the example illustrated in FIGS. 3 and 4 even if the tape recorder 5 or the amplifier 6 are not operating and the power supply is turned off, the tuner can still communicate and operate and control the other unit which has not been turned off. For example, if the amplifier 6 is turned off, the master computer 4a and the tuner 4 can still control the tape recorder 5 and an exchange of information can be made between the master computer 4a and the slave computers 5a. However, of course, since the amplifier 6 is turned off information cannot be exchanged between slave computers 5a and 6a under these conditions. The prior art control apparatus is applicable only to those which include a microcomputer which can latch or generate the serial signal.

Figure 6:
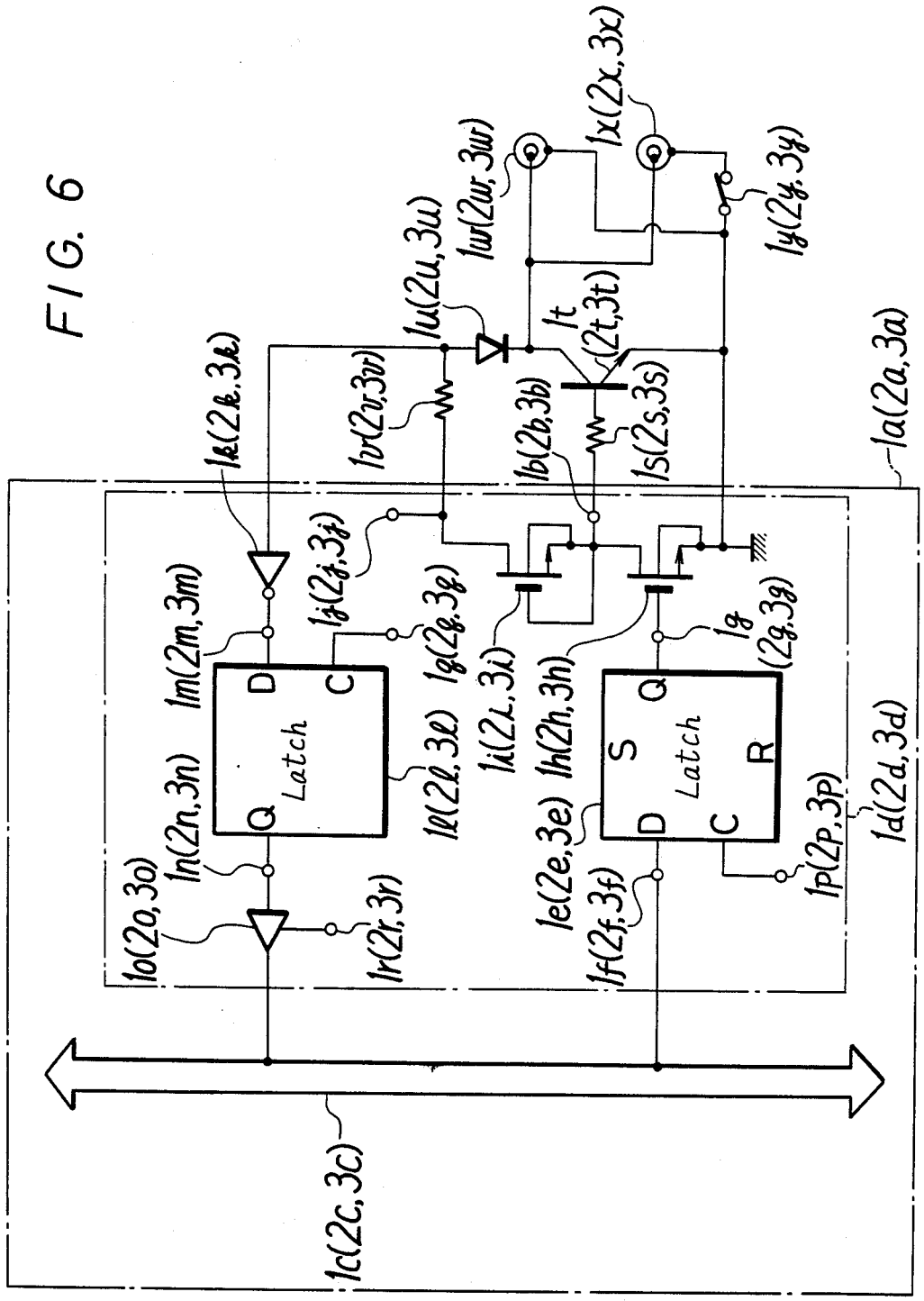
FIG. 6 is a circuit diagram of the remote control apparatus of the invention.

FIGS. 5 and 6 describe the present invention and those elements illustrated in FIGS. 5 and 6 which are similar to those illustrated in FIGS. 1 and 2 are designated by the same references and will not be described in detail.

In the invention, as illustrated in FIGS. 5 and 6, the I/O (input/output) terminal of the microcomputers 1a, 2a and 3a operating as control sections in the tuner 1, the tape recorder 2 and the amplifier 3 are connected in series. The output ports 1b, 2b and 3b of the I/O interface circuits 1d, 2d and 3d in the microcomputers 1a, 2a and 3a are connected through resistors 1s, 2s and 3s to the bases of npn-type transistors 1t, 2t and 3t, respectively. The emitters of the transistors 1t, 2t and 3t are respectively grounded and the collectors are connected to the cathodes of diodes 1u, 2u and 3u respectively. The anodes of the diodes 1u, 2u and 3u are connected through resistors 1v, 2v and 3v to the power source terminals 1j, 2j and 3j, respectively. The connection points between the diodes 1u (2u and 3u) and the resistors 1v (2v and 3v) are connected through inverter circuits 1k, 2k and 3k to signal input terminals 1m, 2m and 3m of the latch circuits 1l, 2l and 3l, respectively.

I/O (input/output) terminals 1w, 1x; 2w, 2x and 3w, 3x are connected in parallel to the collector emitter paths of the transistors 1t, 2t and 3t respectively. Switches 1y, 2y and 3y connected between the I/O terminals 1x, 2x and 3x and ground. The switches 1y, 2y and 3y serve to prevent the audio signal from being deteriorated by double ground. When, for example, one output terminal for the audio signal in the tuner 1 is grounded, the switch 1y is opened. If resistors of proper resistance values are used instead of the switches 1y, 2y and 3y the deterioration of the audio signal due to double earth can be similarly avoided. The I/O terminal 1x of the microcomputer 1a in the tuner 1 is connected to the I/O terminal 2w of the microcomputer 2a in the tape recorder 2 and the I/O terminal 2x of the microcomputer 2a is connected to the I/O terminal 3w of the microcomputer 3a in the amplifier 3.

The I/O terminals 1w, 1x; 2w, 2x; and 3w and 3x are in the high level during the normal mode. The microcomputers 1a, 2a and 3a are programmed so as to generate signals according to the transmission formats which have links that can be varied as illustrated in FIGS. 7A, 7B and 7C. In order to control the signals illustrated in FIGS. 7A, 7B and 7C are supplied as the transmission formats. The transmission format having variable length illustrated in FIGS. 7A–7C consists of a start bit signal formed of a low level signal having a length of 400 microseconds which indicates the start of signal transmission. Then, a 4 bit management data is transmitted to indicate which of the apparatuses is to be controlled and then a 4 bit data length identification signal is transmitted to indicate the data length n occurs. Then the data comprising $8 \times n$ bits is transmitted which contains the command data.

In the embodiment of the invention, the one bit low level signal "0" is the pulse which becomes high level during the time interval from $t_0$ to $t_1$ of 35 seconds and low level during the time interval from $t_1$ to $t_4$ of 65 microseconds as illustrated in FIG. 7B. The one bit high level signal is the pulse which becomes high level during the time interval from $t_0$ to $t_3$ of 65 microseconds and low level during the time interval from $t_3$ to $t_4$ of 35 microseconds as illustrated in FIG. 7C. The low level signal "0" and the high level signal "1" are discriminated by detecting whether such pulses is at the high or low level at a time $t_2$ or 50 microseconds after the leading edge $t_0$ which is a half period determined by the self-clock signals. It is to be particularly noted that in comparing FIG. 6 with FIG. 2, that the only changes made in the invention are that in FIG. 2, the input/output port 1b is directly connected to the inverter 1k and to the junction point between the field effect transistors 1i and 1g whereas in FIG. 6 the input to the inverter 1k is connected through the diode 1u to the terminals 1w and 1x and the output terminal 1b is connected to the resistor 1s through the transistor 1t to the terminals 1w and 1x.

Also, the switch 1y is connected between ground and the terminal 1x as shown and the resistor 1v is connected between power terminal 1j and the inverter 1k. Thus, the structure external to the dash dot line in FIG. 6 comprises the addition to the circuitry of FIG. 2 of the prior art.

According to the invention illustrated in FIGS. 5 and 6, when the microcomputer 1a and the tuner 1 specifies the microcomputer 3a in the amplifier 3 is to perform the exchange of information and to be controlled, the microcomputer 1a supplies the signal having the transmission format shown in FIG. 7A to I/O terminal 1x. At that time in response to the output port 1b from the CPU via the data bus line 1c and the I/O interface circuit 1d the transistor 1t will be turned on or off to supply and turn the signal having the transmission format illustrated in FIG. 7A to the 1/0 terminal 1x. At the same time, the microcomputers 2a and 3a in the tape recorder 2 and the amplifier 3 are continuously inspecting the I/O terminals 2w and 3w at, for example, every 100 microseconds. Thus, if the microcomputer 1a in the tuner 1 produces the low level start bit signal of 400 microseconds, the microcomputers 2a and 3a recognize the start bit signals supplied to the I/O terminals 2w and 3w to interrupt their CPUs and to latch the subsequent signals. In other words, in response to the signal supplied to the I/O terminals 2w and 3w, the diodes 2u and 3u are respectively turned on or off to latch the voltages at the connection points between the diodes 2u and 3u and the resistors 2v and 3v in the CPUs via the I/O interface circuits 2d and 3d and the data bus lines 2c and 3c. Since when the power source of the tape recorder 2 or the amplifier 3 is turned off, the terminal 2j or 3j is not be supplied with a voltage as, for example, of five volts and the terminal 2m or 3m become low level. The diode 2u or 3u is reversely biased by the data (the voltage is 5 volts when the signal is at high level "1" at the I/O terminal 1w to turn it off. Then, the apparatus specified by the management data, for example, the tape recorder 2 is controlled by the microcomputer 3a according to the contents of the data. When the microcomputer 2a and the tape recorder 2 controls the tuner 1 a similar operation is performed. Thus, bidirectional control can be performed. When the control is performed only between the tuner 1 and the amplifier 3 and the power source of the tape recorder 2 is turned off, the transistor 2t will be turned off so that the I/O terminals 2w and 2x of the tape recorder are not grounded. Therefore, control between the tuner 1 and the amplifier can always be accomplished and is never rendered impossible.

As described according to the invention, since the I/O terminals of the microcomputers 1a, 2a and 3a function as the control sections of the tuner 1, the tape recorder 2 and the amplifier 3 are connected in series and only a few control signal lines are sequentially wired between the various equipment which are to be connected.

Also, since the ordinary I/O interface circuits 1d, 2d and 3d are utilized, in order to make it possible to transmit serial signals among the microcomputers 1a, 2a and 3a it is not necessary to provide the prior art I/O interface circuit 4e which includes the serial buffer circuit 4h which is capable of exclusive serial parallel conversion and parallel-serial conversion.

Also, since the ordinary I/O interface circuits 1d, 2d and 3d are provided with circuits which have simple arrangements, it is possible to perform the bidirectional control among any selected apparatuses without turning on the power sources of all of the equipment.

Although in the example given there are illustrated three apparatuses such as the tuner 1, the tape recorder 2 and the amplifier 3, it is to be understood that any number of apparatuses can be controlled such as four or more equipment can be interconnected and controlled.

Although the invention has been described with respect to a single preferred embodiment, it is not to be so limited as changes and modifications can be made which are within the full intended scope of the invention as determined by the appended claims.

We claim as our invention:

1. A remote control apparatus comprising: a microprocessor (1a) for producing a first remote control signal (1f) at its data bus-line (1c); a first latch circuit (1o) which receives said first remote control signal from the data bus-line of said microprocessor; a first buffer circuit (1h, 1l) connected to the output of said first latch circuit and receiving said first remote control signal; a common input/output terminal (1w, 1x); switching means connected between said common input/output terminal and a reference point and controlled by the output of said first buffer circuit so as to produce an output signal corresponding to said first remote control signal at said common input/output terminal (1x); means (2a) for transmitting a second remote control signal to said common input/output terminal (1w); a DC voltage source (1j) connected to said first buffer circuit and said common input/output terminal through a load resistor (1v) and diode means with the cathode of said diode means connected to said common input/output terminal and its anode connected to said load resistor (1v); a second buffer circuit (1k) having input and output terminals the input terminal of which is connected to the anode of said diode means and said load resistor; and a second latch circuit (1l) connected to the output terminal of said second buffer circuit so as to receive an output corresponding to said second remote control signal therefrom and to transfer the same to the data bus-line of said microprocessor.

2. A remote control apparatus according to claim 1, in which said first buffer circuit comprises a first N-channel MOS field effect transistor connected in grounded source configuration and a second N-channel MOS field effect transistor connected between said DC voltage source and the drain of said first N-channel MOS field effect transistor as a load.

3. A remote control apparatus according to claim 1, in which said switching means comprises a transistor having a base, an emitter and a collector, with the base supplied with said first remote control signal and the collector and the emitter connected between said common input/output terminal and said reference point.

4. A remote control apparatus according to claim 3 wherein said transistor is an NPN type.

5. A remote control according to claim 3 including a second resistor connected between the base of said transistor and the drain of said first N-channel MOS field effect transistor.

6. A remote control apparatus according to claim 1, in which said first remote control signal comprises a start bit signal, management data, data length identification signal and remote control data.

* * * * *